United States Patent
Dunmire et al.

(10) Patent No.: US 9,992,119 B2
(45) Date of Patent: Jun. 5, 2018

(54) MOBILITY NETWORK OPERATOR SERVICE DELIVERY HUB

(71) Applicant: AT&T Intellectual Property I, L.P., Atlanta, GA (US)

(72) Inventors: David Dunmire, Roswell, GA (US); Chad C. Keith, Seattle, WA (US); Clifford Marcus Owenby, Heath, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 474 days.

(21) Appl. No.: 14/838,719

(22) Filed: Aug. 28, 2015

(65) Prior Publication Data
US 2015/0372923 A1  Dec. 24, 2015

Related U.S. Application Data

(63) Continuation of application No. 12/720,217, filed on Mar. 9, 2010, now Pat. No. 9,124,554.

(51) Int. Cl.
| | |
|---|---|
| *G06Q 30/00* | (2012.01) |
| *G06F 17/30* | (2006.01) |
| *H04L 12/803* | (2013.01) |
| *G06Q 10/06* | (2012.01) |
| *G06Q 30/04* | (2012.01) |
| *G06Q 30/06* | (2012.01) |

(Continued)

(52) U.S. Cl.
CPC .......... *H04L 47/125* (2013.01); *G06Q 10/06* (2013.01); *G06Q 30/04* (2013.01); *G06Q 30/0601* (2013.01); *G06Q 30/0641* (2013.01); *H04L 47/70* (2013.01); *H04L 63/0272* (2013.01); *H04L 63/0227* (2013.01)

(58) Field of Classification Search
CPC ....... H04L 47/125; G06Q 10/06; G06Q 30/04
See application file for complete search history.

(56) References Cited

U.S. PATENT DOCUMENTS

| | | |
|---|---|---|
| 5,405,488 A | 4/1995 | Kerrigan et al. |
| 6,317,718 B1 | 11/2001 | Fano |

(Continued)

OTHER PUBLICATIONS

U.S. Appl. No. 12/720,277, filed Mar. 9, 2010, Chad C. Keith.

(Continued)

*Primary Examiner* — Kathleen Palavecino
(74) *Attorney, Agent, or Firm* — Baker & Hostetler LLP (57) ABSTRACT

A service delivery hub controlled by a network operator includes an access controller; a network services gateway in communication with the access controller and in communication with external network elements, a partner management center in communication with the access controller and the network services gateway, the partner management center configured to establish a service level agreement with application service providers or enabler providers; an interface defined by the service level agreement, the interface configured to provide a single point access to the application service developers, to provide a set of programming interfaces to the developers whereas the programming interfaces provide access to the external network elements; and a charging system interface to a charging gateway, wherein the charging system is subject to the service level agreement and wherein the service delivery hub allocates revenue in accordance with the service level agreement.

20 Claims, 5 Drawing Sheets

(51) Int. Cl.
*H04L 29/06* (2006.01)
*H04L 12/911* (2013.01)

(56) References Cited

U.S. PATENT DOCUMENTS

| | | |
|---|---|---|
| 6,360,167 B1 | 3/2002 | Millington et al. |
| 6,993,580 B2 | 1/2006 | Isherwood et al. |
| 6,993,707 B2 | 1/2006 | Baker et al. |
| 7,103,351 B2 | 9/2006 | Chaudhari et al. |
| 7,127,609 B2 | 10/2006 | Royer et al. |
| 7,171,567 B1 | 1/2007 | Bayer et al. |
| 7,203,838 B1 | 4/2007 | Glazer et al. |
| 7,254,387 B2 | 8/2007 | Dunlop et al. |
| 7,299,500 B1 | 11/2007 | Klebe et al. |
| 7,533,144 B2 | 5/2009 | Kassab |
| 7,685,422 B2 | 3/2010 | Isozaki et al. |
| 7,716,077 B1 | 5/2010 | Mikurak |
| 7,752,080 B1 | 7/2010 | Greener |
| 7,752,292 B1 | 7/2010 | Katzer |
| 7,870,293 B2 | 1/2011 | Tso |
| 7,912,445 B2 | 3/2011 | Maes |
| 7,941,557 B2 | 5/2011 | Zhu et al. |
| 7,941,562 B2 | 5/2011 | Cheng et al. |
| 8,032,397 B2 | 10/2011 | Lawless |
| 8,086,219 B2 | 12/2011 | O'Neil et al. |
| 8,099,316 B2 | 1/2012 | Moukas et al. |
| 8,112,494 B2 | 2/2012 | Maghraby |
| 8,126,722 B2 | 2/2012 | Robb et al. |
| 8,160,916 B2 | 4/2012 | Moukas et al. |
| 8,204,202 B2 | 6/2012 | Tao |
| 8,359,398 B1 | 1/2013 | Edwards et al. |
| 8,479,298 B2 | 7/2013 | Keith et al. |
| 2001/0005372 A1 | 6/2001 | Cave et al. |
| 2002/0087335 A1 | 7/2002 | Meyers et al. |
| 2002/0087661 A1 | 7/2002 | Matichuk et al. |
| 2002/0091568 A1 | 7/2002 | Kraft et al. |
| 2002/0138331 A1 | 9/2002 | Hosea et al. |
| 2003/0032409 A1 | 2/2003 | Hutcheson et al. |
| 2003/0105955 A1 | 6/2003 | Carroll et al. |
| 2003/0120502 A1 | 6/2003 | Robb et al. |
| 2003/0151619 A1 | 8/2003 | McBride |
| 2003/0158930 A1 | 8/2003 | McBride |
| 2004/0073713 A1 | 4/2004 | Pentikainen et al. |
| 2005/0015340 A1 | 1/2005 | Maes |
| 2005/0034063 A1 | 2/2005 | Baker et al. |
| 2006/0167805 A1 | 7/2006 | Manthoulis et al. |
| 2006/0241986 A1 | 10/2006 | Harper |
| 2007/0027784 A1 | 2/2007 | Kahn et al. |
| 2007/0047523 A1 | 3/2007 | Jiang |
| 2007/0130505 A1 | 6/2007 | Woods |
| 2007/0168228 A1 | 7/2007 | Lawless |
| 2007/0208574 A1 | 9/2007 | Zheng et al. |
| 2008/0154656 A1 | 6/2008 | Kail et al. |
| 2008/0275980 A1 | 11/2008 | Hansen |
| 2009/0019535 A1 | 1/2009 | Mishra et al. |
| 2009/0027784 A1 | 1/2009 | Tsai |
| 2009/0089131 A1 | 4/2009 | Moukas et al. |
| 2009/0131025 A1 | 5/2009 | Sharma et al. |
| 2009/0138563 A1 | 5/2009 | Zhu et al. |
| 2009/0156213 A1 | 6/2009 | Spinelli et al. |
| 2009/0185669 A1 | 7/2009 | Zitnik et al. |
| 2009/0210702 A1 | 8/2009 | Welingkar et al. |
| 2009/0286507 A1 | 11/2009 | O'Neill et al. |
| 2010/0042688 A1 | 2/2010 | Maghraby |
| 2010/0077321 A1 | 3/2010 | Shen et al. |
| 2010/0080361 A1 | 4/2010 | Houghton |
| 2010/0138480 A1 | 6/2010 | Benedetto |
| 2010/0280962 A1 | 11/2010 | Chan |
| 2010/0292556 A1 | 11/2010 | Golden |
| 2011/0131408 A1 | 6/2011 | Cook et al. |
| 2011/0225060 A1 | 9/2011 | Dunmire |
| 2011/0225061 A1 | 9/2011 | Keith et al. |
| 2011/0225320 A1 | 9/2011 | Keith et al. |
| 2011/0225636 A1 | 9/2011 | Keith |
| 2012/0030019 A1 | 2/2012 | Dunmire |
| 2012/0030478 A1 | 2/2012 | Dunmire |
| 2012/0030774 A1 | 2/2012 | Keith |

OTHER PUBLICATIONS

U.S. Appl. No. 12/720,300, filed Mar. 9, 2010, Chad C. Keith.
U.S. Appl. No. 12/847,635, filed Jul. 30, 2010, David Dunmire.
U.S. Appl. No. 12/847,731, filed Jul. 30, 2010, Chad C. Keith.
U.S. Appl. No. 12/847,774, filed Jul. 30, 2010, David Dunmire.
U.S. Appl. No. 12/847,793, filed Jul. 30, 2010, Chad C. Keith.
U.S. Appl. No. 12/720,217, filed Mar. 9, 2010, Dunmire.
Kushan, "The next 400 million; Though voice still remains the money spinner, telecom operators and handset makers are betting big on services to acquire the next 400 million customers. Kushan Mitra goes into the details", Business Today, New Delhi, May 3, 2009, pp. 1-7.
M2 Presswire, "IMimobile: 1M I mobile Announces first fully Integrated MobileAd Platform", Coventry: Jan. 22, 2008, p. 1.
Morgan, "Microsoft Rides the ASP Wave", http://search.proquest.com/docview/2268850817 accountid= 14 7 53, 2000, accessed Jul. 22, 2014, 2 pgs.

MOBILITY NETWORK OPERATOR SERVICE DELIVERY HUB

CROSS REFERENCE TO RELATED APPLICATIONS

This application is a continuation of U.S. patent application Ser. No. 12/720,217 filed Mar. 9, 2010, entitled "Mobility Network Operator Service Delivery Hub," the content of which is incorporated by reference herein in its entirety.

TECHNICAL FIELD

This invention is directed to a service delivery platform, and more particularly, to a system, apparatus, and method for providing network based services to third party application providers and enablers.

BACKGROUND

Third party application service providers often require access to telecommunications services in order to exercise their respective business models. Traditionally, network operators have been able to develop systems and processes for providing third parties such desired access. Service delivery platforms created by network providers and tied to the network are used to provide native services to application service providers. Such service delivery platforms become an economical and efficient mechanism for providing network access.

The problem is that the functionality of service delivery platforms is very limited, most often to access, bandwidth and load control, and security with little other functionality provided. Moreover, service delivery platforms are local to the networks being accessed, meaning third party developers need to negotiate agreements and replicate their solution on multiple delivery platforms. The limited nature of service delivery platforms is especially difficult in the wireless telecommunications industry where rich network functionality is developing and becoming available yet not accessible to the third party developers. Thus there is a need for a full function service delivery platform which provides additional functionality including monetization, hosting, policy control, storefront sales portals, settlement, reporting, routing, and service management. There is also a need for a centralized service delivery platform to provide a single point of access to application developers to avoid replication of offerings and inefficient use of resources. Finally, there is a need to expand this functionality beyond application service providers to enablers and content aggregators and other third parties.

SUMMARY

A service delivery hub controlled by a network operator includes an access controller; a network services gateway in communication with the access controller and in communication with external network elements, a partner management center in communication with the access controller and the network services gateway, the partner management center configured to establish a service level agreement with application service providers or enabler providers; an interface defined by the service level agreement, the interface configured to provide a single point access to the application service developers, to provide a set of programming interfaces to the developers whereas the programming interfaces provide access to the external network elements; and a charging system interface to a charging gateway, wherein the charging system is subject to the service level agreement and wherein the service delivery hub allocates revenue in accordance with the service level agreement. The network services gateway communicates with the external network elements via a VPN tunnel. The network services gateway provides an interface to a network enabler, wherein the network enabler provides access to external network elements and wherein the access controller includes policy control functionality. The access controller provides an interface to a portal and also provides an interface to an aggregator, wherein the aggregator is configured to combine applications from one or more application service providers and provides aggregated content through the service delivery hub in accordance with a service level agreement. The single point of access for the application is provided by a partner management center configured to enter into a service level agreement with a network operator, and wherein the service delivery platform is further configured to develop and test an application, to obtain certification of the application and to transmit the application to be hosted on the service delivery hub, and wherein the service delivery hub is configured to distribute the application to one or more other networks or locales without the application service provider requiring independent access to the one or more other networks. There is also an operations and maintenance function to load balance access to the network elements.

In accordance with another embodiment of the invention, there is provided a system for providing services to mobile customers including a service delivery hub configured for establishing service level agreements with third party application service providers or enabler providers; managing access to the network, monitoring and allocating external network resources, interfacing with external mobile networks or external network subsystems; and interfacing with a charging system, a network enabler in communication with the service delivery hub to provide services to customers of external mobile networks, a portal in communication with the service delivery hub for providing access to third party application providers or enabler providers, and a charging system in communication with the service delivery hub; wherein the service delivery hub provides a single point of access to the third party application providers or enabler providers and wherein the applications and enablers are provided to the customer of the external networks.

In accordance with another embodiment of the invention, there is provided a method of distributing applications from a single point of entry in a network including the steps of providing login credentials to an application service provider to a service delivery hub; establishing a service level agreement between the application service provider and the service delivery hub, receiving an application at the service delivery hub; receiving a request for purchasing an application at the service delivery hub from a storefront; providing network access for distribution of the application; and settling a transaction among the service delivery hub and the application service provider in accordance with the service level agreement.

BRIEF DESCRIPTION OF THE DRAWINGS

The following description is better understood when read in conjunction with the appended drawings, wherein.

DETAILED DESCRIPTION OF ILLUSTRATIVE EMBODIMENTS

For the purposes of describing an exemplary embodiment of the invention, reference will be made to the figures set forth above and certain terms. As an aid to the reader, exemplary definitions of such terms are defined as follows:

"Application service provider (ASP)" is a provider which has one or more applications which employ the services of the service delivery hub.

"Aggregator" has relationships to one or more content, application or service providers and manages the access of their respective applications to the service delivery hub.

"Enabler provider (EP)" An enabler provider develops services against its own resources and services with the option to mesh those resources and services with those of the network operator or other enabler providers, for example, a message enabler provider may provide access to WAP push, SMSC, and MMSC services as set forth below.

"On device" applications are applications that are downloadable to a device such as a mobile handset or smart phone.

"Web-hosted based" applications are applications which are sold in a subscription based model and accessed by customer devices.

Figure 1:
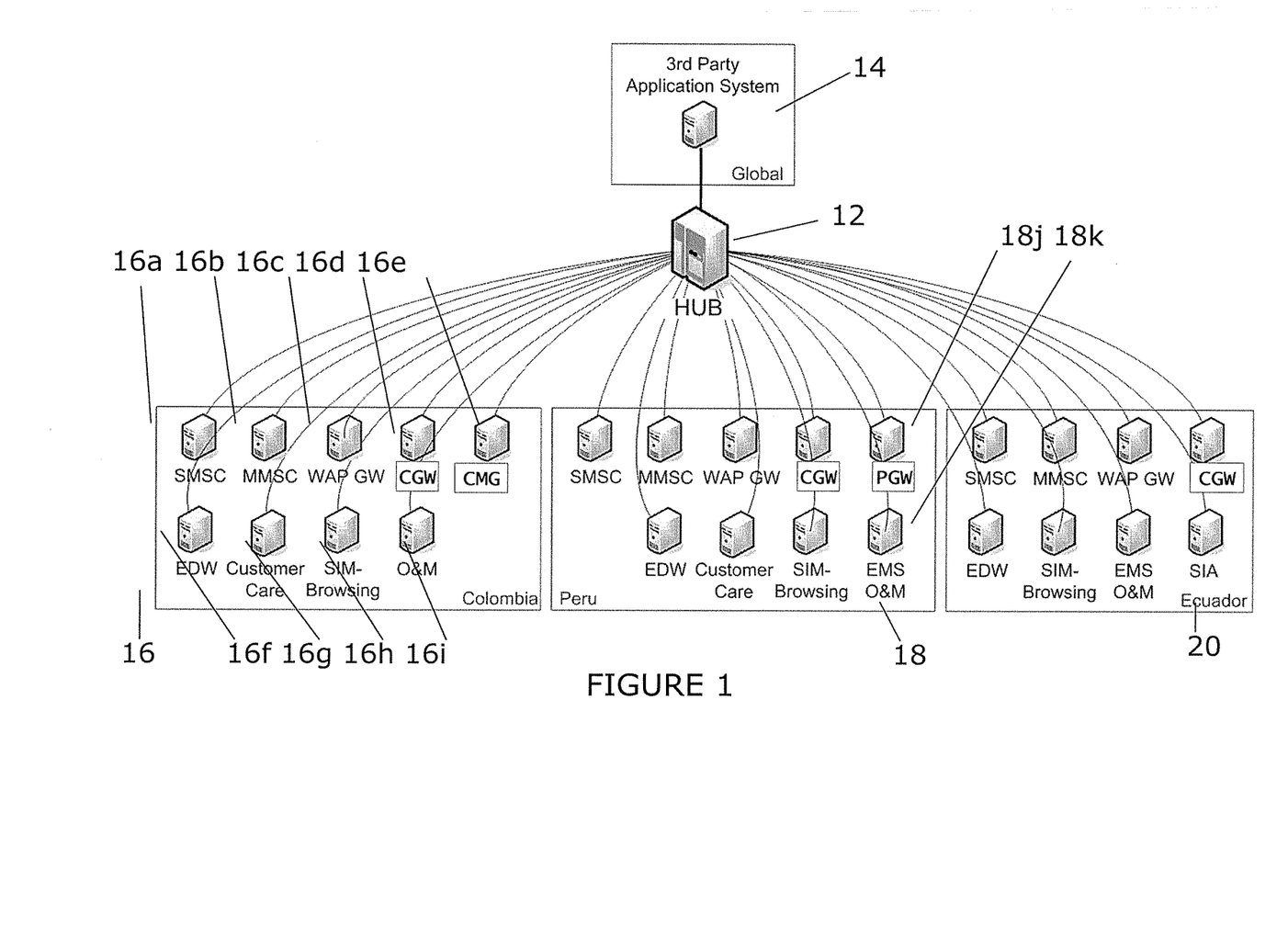
FIG. 1 is a system diagram of a service delivery hub in communication with remote networks.

With reference to FIG. 1, there is shown a system 10 having a service delivery hub 12 in communication with network operations 16, 18, and 20. As described more fully herein, the service delivery hub 12 provides a central access point for third party ASPs, aggregators, and enabler providers and includes a set of application programming interfaces (APIs) provided by the network provider or enabler providers. The service delivery hub 12 also includes a charging gateway which provides the capability for third parties to monetize their applications and a settlement center which balances accounts of multiple parties and network operators in accordance with contractual fee splitting arrangements or other mechanisms determined by the parties, so-called recursive settlements. The service delivery hub 12 also includes a control center to manage access to the system.

Referring again to FIG. 1, there is shown a third party application server 14 in communication with the service delivery hub 12. The service delivery hub 12 is targeted to produce an integration layer for access to the network operations 16, 18, and 20, specifically network elements, operational support systems and business support systems (OSS/BSS), and Internet application service providers (ASPs). The network operations 16, 18, and 20 (also referred to as networks herein) are illustrative only and may vary in number from one to many networks. The networks may be stand alone networks in a particular geographic area, which areas may be delineated on a country or state basis or any other geographic distinction. The networks may also be delineated by network operator or network type. There may also be more than one network in any one geographic region.

In the exemplary embodiment of FIG. 1, network operations 16 are designated as being in the country of Columbia, network operations 18 in Peru, and network operations 20 in Ecuador. Within each network operations 16, 18, 20, there is shown a representative sample of network subsystems contained therein and, in the case of network operations 16 in Columbia, shown numbered as 16a-16i. Those subsystems within network operations 16 include the short message service center (SMSC) 16a, multi-media service center (MMSC) 16b, wireless access protocol (WAP) gateway 16c, a charging gateway labeled (CGW) 16d, a charging and messaging gateway (CMG) used by aggregators 16e, enterprise data warehouse (EDW) 16f, customer care 16g, subscriber interface module (SIM) browsing 16h, and operations and maintenance (O&M) 16i. It will be understood by those skilled in the art that the identification of such subsystems is representative and is not meant to specify any one type of proprietary system and that each country or location may have its own instance of such subsystems. Moreover, not all subsystems are necessarily found in each network operations 16, 18, 20 and there may be other subsystems not listed above, for example, profile gateway (PGW) 18j, and emergency management systems (EMS) 18k are illustrated as part of network operation 18 but not as part of network operation 16.

The service delivery hub 12 exposes access to third party applications to network services provided by the network subsystems. The service delivery hub 12 supports third party developed services and controls application usage of network operations and third party services. It is preferred that the service delivery hub 12 employ industry standards known to those skilled in the art or to be developed by the industry, including but not limited to Parlay X, SOAP, REST, HTTPS, JKD 1.5, XML, SSL+X509 certification for transport security, and WSSE username token profile security.

The service delivery hub 12, has interfaces into each of the subsystems within network operations 16, 18, 20. An exemplary methodology for using those interfaces may include establishing a VPN tunnel from the service delivery hub 12 to the subsystem of interest. Thus, if an application residing on the third party application system server 14 desires access to SMSC 16a, the service delivery hub 12 will establish a VPN tunnel or other connection to SMSC 16a thereby providing the application access to SMSC 16a.

Figure 3:
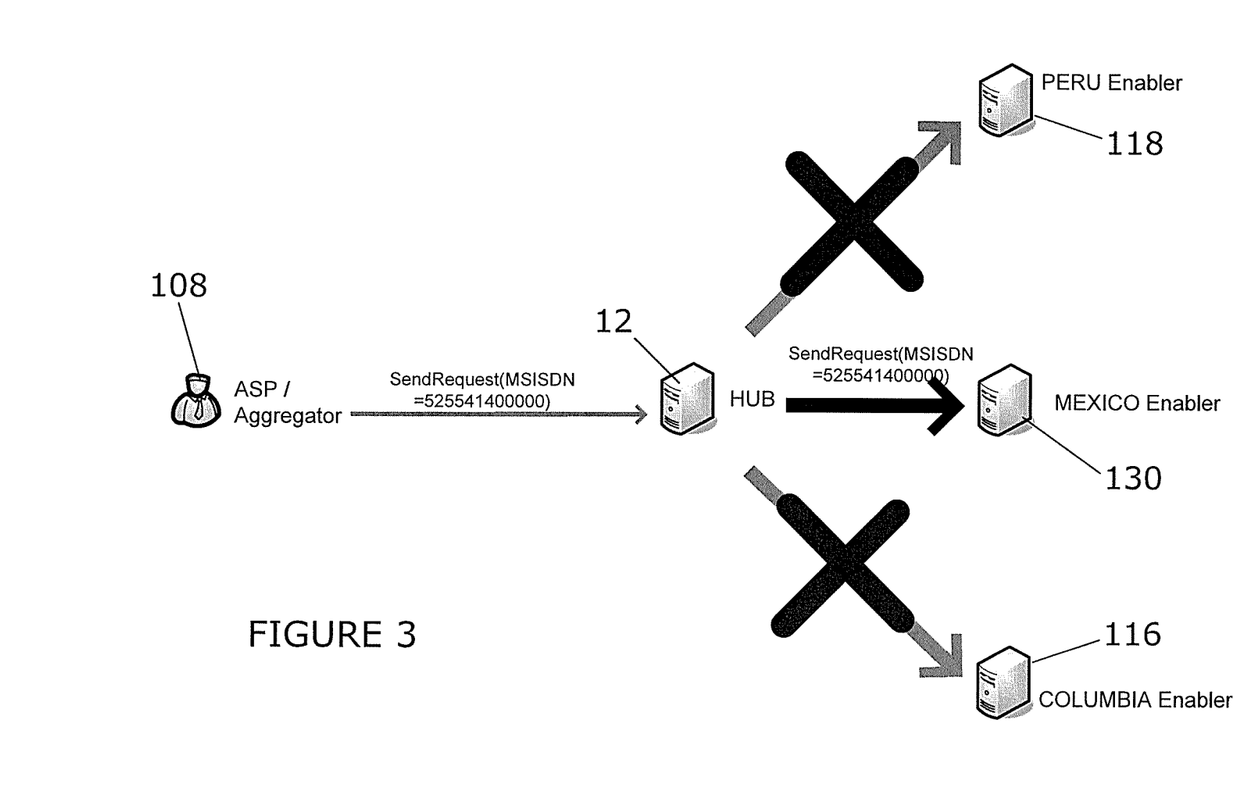
FIG. 3 is a block diagram illustrating the routing control function of the service delivery hub.

An example of this routing is shown in FIG. 3. In that example, an aggregator 108 is utilizing the service delivery hub 12 to access an enabler 130 located in Mexico through an API provided by enabler 130 and made available to aggregator 108 through service delivery hub 12. The aggregator will send a request message to the service delivery hub 12 which includes an identifier, in this case, a MSISDN. The service delivery hub 12 will interpret the MSISDN and determine that it is destined for enabler 130 located in Mexico and not for the enablers 116 and 118 located in Columbia and Peru, respectively. The service delivery hub 12 then establishes a VPN tunnel to the enabler 130 located in Mexico and will prevent access to other networks. This limited but direct access may be monetized by the enabler and the network operator.

The service delivery hub 12 operates based on a series of service level agreements (SLAs) between various parties and the network operator. The service delivery platform 12 encapsulates access to the network enablers, OSS/BSS enablers, third party provided enablers and ASP applications. The service delivery platform 12 provides an application service creation gateway which provides standard APIs and software development kits (SDKs) to third party application providers. The service delivery hub 12 provides management functions for partners and aggregators, such as authentication, hosting, SLA policy control, service routing, limited charging, messaging, usage billing, settlement, monitoring, and reporting.

Figure 2:
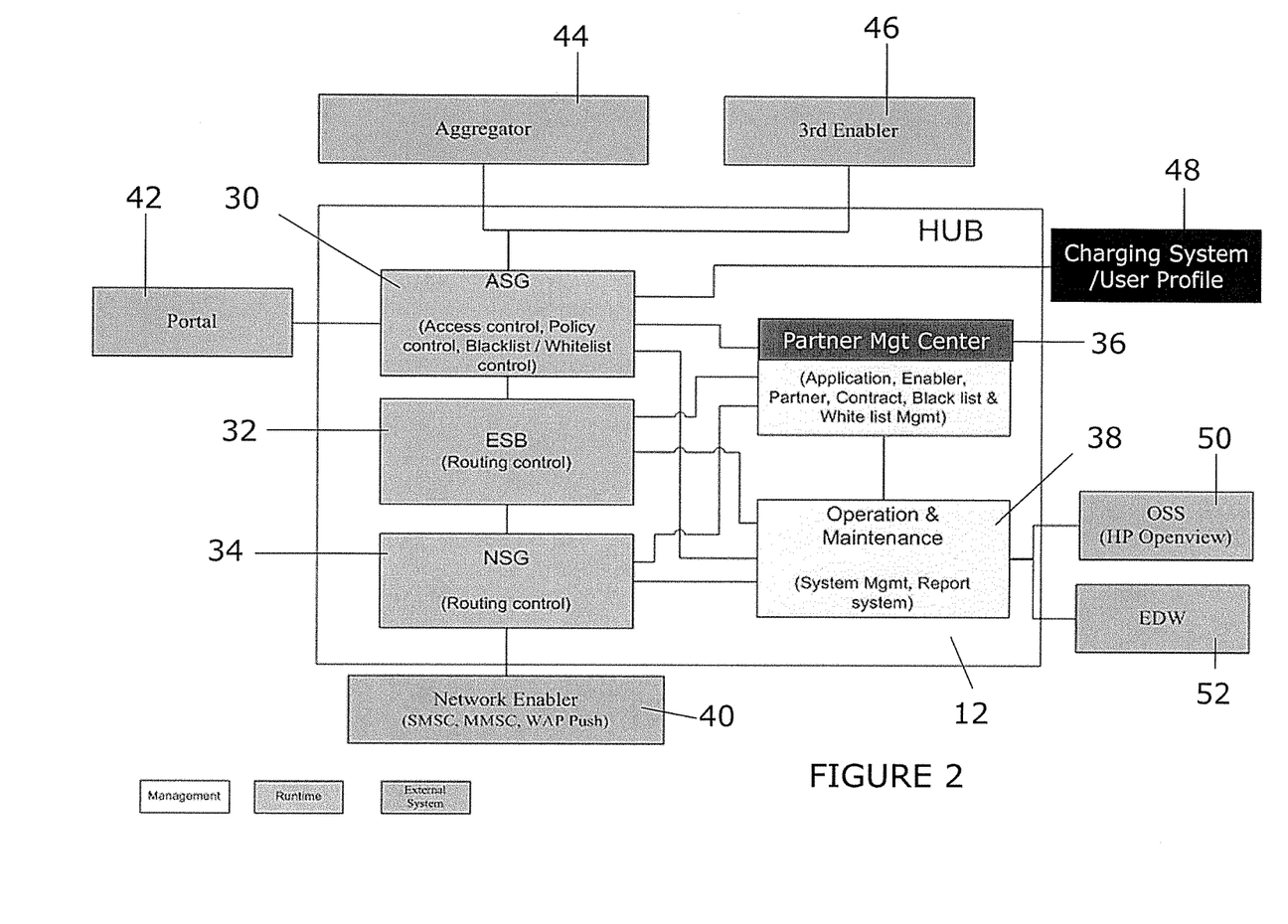
FIG. 2 is a block diagram illustrating the functions of the service delivery hub and the interfaces open to third parties.

With reference to FIG. 2, an exemplary service delivery hub includes 12 functionality such as application service gateway (ASG) 30, enterprise service bus (ESB) 32, network service gateway (NSG) 34, partner management center 36, and Operation & Maintenance 38. External to the service delivery hub 12 may be HP Openview 50 which may be an implementation of an OSS supporting the operation and maintenance 38. ASG 30 provides access control, policy control, and blacklist/whitelist control.

Portal 42 provides an external link which uses the ASG 30 functionality to control access to the service delivery hub and further to authenticate users. The portal function 42 of the service delivery hub 12 provides for the sales and distribution of content and services, including third party applications. Specific functionality may include device management and rendering, a recommendation engine, detailed application descriptions, product categorization, multi-language support, sales and revenue settlement reports, advertising associations and multi-network footprint.

The charging gateway "/User Profile Server 48, shown in an exemplary embodiment as outside of service delivery hub 12 but interfacing therewith, provides storage media for user information and profiles. Access to the charging gateway/User profile server 48 by the ASG function 30 is routed through the ESB 32. Additional access and control interfaces are provided within the ASG function 30 for access by aggregators 44 and third party enablers 46.

The access control function within ASG 30 provides services such as service provider and user authentication and verification. The ASG 30 allocates and prioritizes service delivery hub 12 resources for the application accessing the service delivery hub 12. The service level policy control function enables the service delivery hub 12 to control and, if necessary, limit the system resources available to a third party application to prevent system overloading. By controlling the system resources through the service delivery hub, the network resources are able to be allocated along a broad range of applications. Policy control also provides for monetization at the service level or the parameter level for access to all network enablers. The scarcity of or availability of resources depending on time of day and loading algorithms provide variable and cost effective price strategies to third party developers and enablers. Quality of service and pricing associated therewith may also be provided by the policy control function.

Routing control functionality is provided by enterprise service bus (ESB) 32. This includes developing or configuring the routing policy. The routing control functionality of the service delivery hub 12 enables the third party providers to interface with the network or multiple networks at one and only one access point. The service delivery hub 12 is preferably able to interpret the MSISDN to determine the local network operator involved in the transaction and route accordingly. For example, the ESB 32 may route based on MSISDN in a GSM environment. The routing may also be determined based on location, including country or market, or a sales portal catalog.

The network services gateway (NSG) 34 within the service delivery hub 12 interfaces with network enablers 40 to provide access to network functionality, including, for example, SMSC 16a, MMSC 16b, or WAP GW 16c or any other network elements or systems. The NSG 34 protects the network resources from overloading, manages all requests against an element and weighs any new requests coming in against the configured load capacity of any element. If multiple elements are available, it will load balance the requests across the multiple elements. For example, if there are multiple SMSCs 16a in a given region, if one SMSC 16a is overloaded, the NSG 34 may transfer load to another SMSC 16a.

Figure 4:
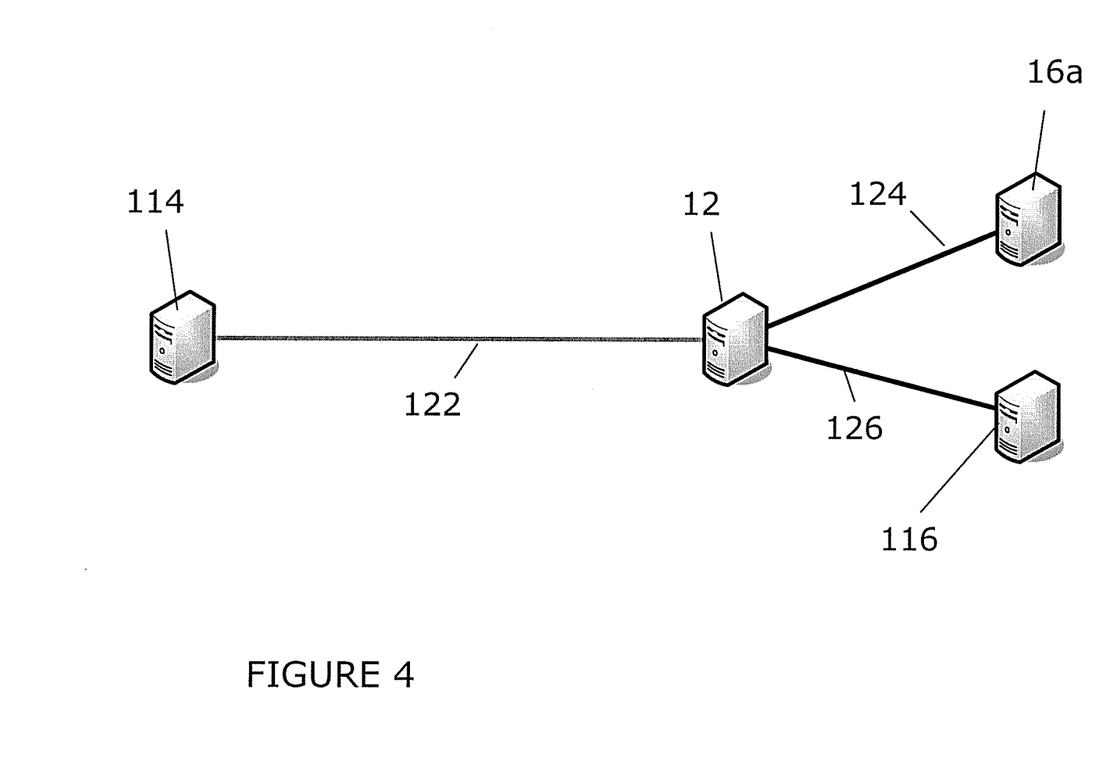
FIG. 4 is a block diagram illustrating the accessing of an enabler through the service delivery hub by a third party.

The service delivery hub 12 includes a partner management function 36 which include the contracting capability between the network operators and the enabler providers and the network operators and the ASPs. The partner management functions 36 include the ability to allow an administrator to configure contracts and SLAs for utilizing the charging module for charging transactions. for example, the charging subsystem 116 in FIG. 4. In that example, a third party 114 may access the service delivery platform 12 using the SOAP protocol interface 122 to access the SMSC subsystem 16a located in Columbia under contract. The service delivery platform 12 will access the chargingsubsystem 116 for charging and reconciling the cost of such access to the third party (or its customers). In this example, the partner management function 36 plays the role of establishing the contracts and SLAs in the network. The act of establishing the connectivity and the routing is performed by the ASG 30 and ESB 32 for the charging reference and the ASG 30, ESB 32, and the NSG 34 for the SMSC reference. From a third party's development standpoint, the third party system 114 will receive an API for the desired enabler, in this example, the SMSC 16a in Columbia. The third party would then develop the program using the API on the third party system 114 and test the program using the service delivery hub 12 test environment. Once development is completed, the third party system 114 will complete its purchase of access to the enabler and cut over to the production version of the service delivery hub 12.

Referring again to FIG. 2, the operations and maintenance functionality 38 of the service delivery hub 12 includes system management and reporting functions and provides interfaces to the operational support systems (OSS) 50 and electronic data warehouses (EDW) 52. The operations and maintenance function 38 is to support the platforms from a performance, availability and trouble-shooting perspective. Alarms will be sent to the OSS 50 when subsystems of the overall architecture are unavailable. The settlement functionality lies within the partner management center 36 of the service delivery hub 12 and provides allocation of revenue and reports covering various aspects of sales. This may include asset sales such as applications or enabler usage. Report features may include multi-currency and multi-country settlements. Moreover, there may be recursive settlement functionality for multi-party transactions. The reporting functionality within the partner management center 36 of the service delivery hub 12 may be customized for a variety of applications and enablers. For example, reports may include application service provider settlements, application service provider traffic, enabler provider settlement, enabler provider traffic, traffic TPS reports, error, availability and sales portal reports.

The service delivery hub 12 provides the added functionality of monetization of third party applications and services. For example, the network enablers are provided the tools to be able to charge at the parameter level for access to all network enablers. Using the access control and other policy rules, the network operator, on behalf of third party enabler providers, is able to throttle or gate applications based on TPS or total volume, time of day and other parameters.

Moreover, the network operators may apply quality of service to the network-based APIs and third party supplied APIs.

With respect to third party enablers, the network operator may pay or revenue share for the use of such enablers. The network operator may sell access to the third party enablers. Finally, the network operator may recursively charge and settle with third party enablers.

In operation, the ASP may enter into a contractual relationship with a mobile network operator through which contract the network operator will provide functionality and interfaces defined by a set of SLAs to the ASP. The ASP incorporates the functionality into the application. The application is then either sold on the network operator's portal 42 (or multiple portals located in different geographic areas) or sold directly to the consumer.

Continuing with an operational view, an enabler, either a third party network enabler or a third party application enabler, may also enter into a contractual relationship with the mobile network operator. The enabler may provide a set of interfaces to the service delivery hub 12 on a revenue share basis to be used by third party ASPs using the service delivery hub 12.

There are many examples of this monetization business model. For example, application service providers utilizing the service delivery hub may contain products or services offered to the customers and include contractual terms with the network operator through which the network operator and the ASP both share in the monetization of an application. For example, video game developers may offer a gaming system to its customers on a storefront accessible through the portal 42 of the service delivery platform. The game may include, for example, a free trial version downloadable to a mobile device with an option to purchase the full version. The network operator will receive the order from the customer, deliver the full version of the game to the customer, receive payment from the customer, and then share the revenue generated with the ASP.

According to another exemplary utilization of the invention, an enabler may provide messaging services through an API that is made available to the ASP developing a video gaming application. For example, the enabler may offer two products to the ASP for a gaming application, sending and receiving SMS messages and sending and receiving MMS messages which permit users of the game to text or video chat while playing the game. For each, the ASP may charge its customers either a flat fee or a use-based fee or build the fee into the cost of the game. The network operator may charge the ASP a set-up fee, a maintenance fee, or a service-level based fee for use or a flat-rate fee for use.

In another exemplary embodiment, an enabler may provide a service to the network operator on behalf of third party ASPs. For example, the enabler may provide mobile advertising services, including getting advertisements, posting advertisements and tracking advertisements. Depending on the contractual relationships, the parties involved in the transaction may share the advertising revenue either two ways, i.e., the enabler provider and network provider, or three ways, including the ASP.

Application service providers may sell anything using the network operator's storefront or its own storefront. In addition to on-device applications in which applications such as games are downloadable directly onto a mobile device, the service delivery platform also supports web-hosted based applications which are stored on network and accessed by mobile devices through a portal. The service delivery hub permits the ASP to host its own web-hosted applications or have them hosted in a network cloud operated by the network operator. In the latter case and using the example of a gaming system, the gaming system may be hosted in the network cloud and offered to subscribers on a subscription (fee per month) basis. As such, the service delivery hub 12 permits the ASP to access and post its offering in one location, while outsourcing to the network operator the hosting, accounting, fulfillment, collection and settlement functions, with a revenue share used to monetize the offering.

In the ASP model, there may be aggregators of content that utilize the services of the network operator through the service delivery hub 12. Content to be aggregated may be obtained from ASPs, for example, a gaming aggregator may offer multiple games from a variety of ASPs on a single storefront, either its own storefront or a storefront accessible through the network operator portal. Alternatively, such aggregators may make their content available to ASPs or directly to customers of network operators. For example, content aggregators may collect and offer music under contract with recording studios and make that music content available to game developers for a fee. In either case, the aggregators utilizing the service delivery hub 12 are able to deploy a single interconnection and achieve distribution across a wide array of network operators in diverse geographical locations.

Enablers may provide access via application programming interfaces (APIs) to a wide range of functions. On the portal side, API's may be provided for functions including ownership checking, purchasing, quoting, delivery, catalog discovery, device checking, advertising and subscription notification. Network API's may be provided for charging, customer profiling, SMS, WAP Push and MMS. External API's may include searching functionality, while service delivery hub API's may include alarm notification. Moreover, external API's may be used by third party developers to create their own enablers that can be resold to other providers or other developers or embedded as a library in an SDK.

Figure 5:
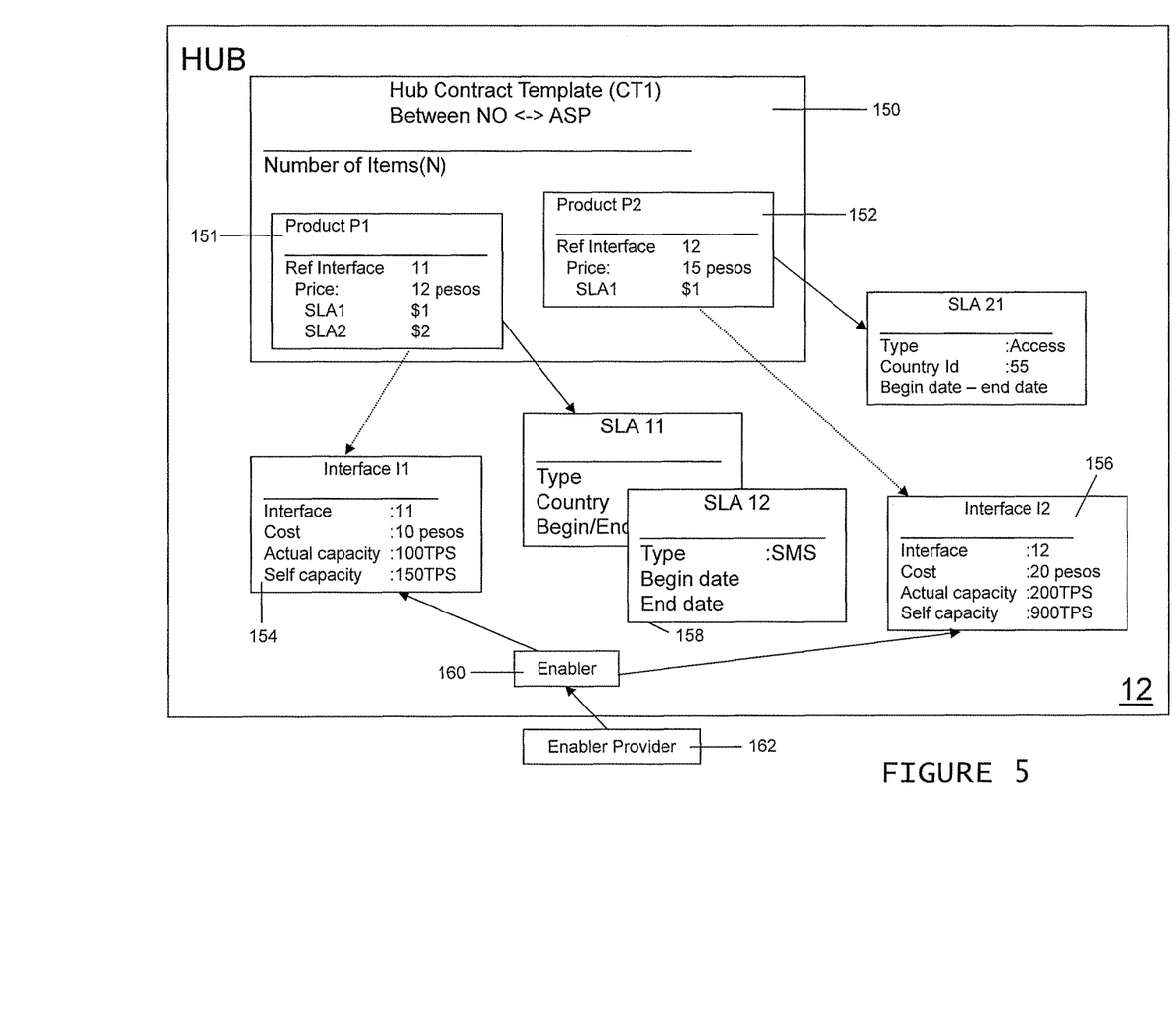
FIG. 5 is a block diagram illustrating an example of the functions of the business process between the network operator and an ASP.

With reference to FIG. 5, there is shown a block diagram illustrating an exemplary embodiment of the functions of the business process implemented by specially programmed computer servers. The transaction is between the network operator and an ASP as supported by the service delivery hub 12. The server associated with an ASP will access the service delivery hub 12 to complete a contract template 150, which in this example, contains a request to purchase two products, P1 151 and P2 152. The template sets forth contractual terms including the product and the price and any applicable SLAs 158 for each of those products 151 152. Each product then is referred to an application programming interface, shown as API 154 for product P1 151 and API 156 for product P2 152. Each of those APIs are provided by a third party enabler 162 through an enabler function 160 located within the service delivery hub 12, and in this example, each also has an associated cost. With this business relationship established, the ASP then may utilize the service delivery hub 12 in the execution of its business plan.

While the service delivery hub been described in connection with the various embodiments of the various figures, it is to be understood that other similar embodiments can be used or modifications and additions can be made to the described embodiment for performing the same types of functionality in service delivery without deviating therefrom. For example, one skilled in the art will recognize that the service delivery hub 12 may be located anywhere with portal access from multiple locations. The service delivery hub 12 may provide access to one or multiple networks simultaneously and block access to other networks. The service delivery platform 12 may be scaled to provide access to a plurality of networks either domestic or international. Any type of telecommunications network may be supported, including but not limited to GSM, CDMA, EDGE, 3G, 4G, LTE or any other wireless network. While VPN tunneling to connect to the plurality of networks has been described, other types of access and communications are contemplated, including SSL. Therefore, the service delivery hub 12 should not be limited to any single embodiment, but rather should be construed in breadth and scope in accordance with the appended claims.

What is claimed:

1. A method comprising:
   determining, by a service delivery hub, that a service level agreement exists between a network operator and an application service provider;
   providing an interface defined by the service level agreement, wherein the interface is configured to provide a single point access for the application service provider to access a first network enabler that provides access to at least one network element in a first network and a second network enabler that provides access to at least one network element in a second network;
   receiving, at the service delivery hub, a request from the application service provider to communicate with the first enabler;
   establishing, through the interface, a connection for the application service provider to access the first enabler; and
   determining, based on the service level agreement, a cost of the application service provider's access to the first enabler.

2. The method of claim 1, wherein the connection is a VPN Virtual Private Network (VPN) tunnel.

3. The method of claim 1, further comprising determining that the request is for the application service provider to communicate with the first enabler based on a Mobile Station International Subscriber Directory Number (MSISDN) included in the request.

4. The method of claim 1, further comprising determining that the request is for the application service provider to communicate with the first enabler based on the location of the application services provider.

5. The method of claim 1, further comprising controlling access to the first enabler based upon a policy control.

6. The method of claim 5, wherein controlling access includes limiting access to the at least one external network element in the first network by the application service provider to prevent overloading.

7. The method of claim 1, further comprising allocating a portion of the cost to the first enabler.

8. The method of claim 1, further comprising balancing load access to the at least one external network element in the first network.

9. A system comprising:
   a partner management center configured to establish a service level agreement between a network operator associated with the system and a user;
   an interface defined by the service level agreement, the interface providing a single point access for the user to access a first external network and a second external network;
   a network services gateway including a first interface in communication with a first enabler of the first external network and a second interface in communication with a second enabler of the second external network;
   an application service gateway that provides to the user an application programming interface for communicating with the first enabler and the second enabler;
   an enterprise service bus for establishing a connection to the first enabler and for routing communications between the user and the first enabler and for routing communications between the user and the second enabler; and
   a cost system for determining a cost of the user's access of at least one of the first enabler and the second enabler.

10. The system of claim 9, wherein the connection is a Virtual Private Network (VPN) tunnel.

11. The system of claim 9, further comprising determining that the request is for the application service provider to communicate with the first enabler based on a Mobile Station International Subscriber Directory Number (MSISDN) included in the request.

12. The system of claim 9, wherein the application service gateway is configured to control access to the first enabler based upon a policy control.

13. The system of claim 12, wherein the policy control includes limiting access to the first external network element by the user to prevent overloading.

14. The system of claim 9, wherein the cost system is configured to allocate a portion of the cost to the first enabler.

15. The system of claim 9, wherein the user is an application services provider.

16. The system of claim 9, wherein the user is an aggregator.

17. The system of claim 9, wherein the partnership management center is configured to establish a second service level agreement between the network operator and an enabler provider associated with the first enabler.

18. The system of claim 9, wherein the enterprise service bus is configured to determine that the user is requesting access to the first enabler based on a location of the user.

19. The system of claim 9, wherein the application service gateway is configured to balance load access to the first external network element.

20. The system of claim 9, wherein the application services provider receives the application programming interface from the first enabler.

* * * * *

UNITED STATES PATENT AND TRADEMARK OFFICE
CERTIFICATE OF CORRECTION

PATENT NO. : 9,992,119 B2
APPLICATION NO. : 14/838719
DATED : June 5, 2018
INVENTOR(S) : David Dunmire et al.

It is certified that error appears in the above-identified patent and that said Letters Patent is hereby corrected as shown below:

In the Claims

Claim 2, Column 9, Line 37, delete "VPN Virtual Private Network (VPN) tunnel."
and insert -- Virtual Private Network (VPN) tunnel. --.

Signed and Sealed this
Fourth Day of December, 2018

Andrei Iancu
*Director of the United States Patent and Trademark Office*